(12) United States Patent
Noda

(10) Patent No.: US 8,802,272 B2
(45) Date of Patent: Aug. 12, 2014

(54) METHOD OF PRODUCING POLYOLEFIN MICROPOROUS MEMBRANE AND SEPARATOR FOR LITHIUM ION BATTERY

(71) Applicant: Ippei Noda, Gamagori (JP)

(72) Inventor: Ippei Noda, Gamagori (JP)

(73) Assignee: Takemoto Yushi Kabushiki Kaisha, Gamagori, Aichi (JP)

( * ) Notice: Subject to any disclaimer, the term of this patent is extended or adjusted under 35 U.S.C. 154(b) by 0 days.

(21) Appl. No.: 13/901,883

(22) Filed: May 24, 2013

(65) Prior Publication Data

US 2013/0252067 A1  Sep. 26, 2013

Related U.S. Application Data

(63) Continuation-in-part of application No. 12/955,095, filed on Nov. 29, 2010, now abandoned.

(51) Int. Cl.
| | |
|---|---|
| *H01M 2/16* | (2006.01) |
| *H01M 10/0525* | (2010.01) |
| *B01D 67/00* | (2006.01) |
| *H01M 2/14* | (2006.01) |
| *B01D 69/14* | (2006.01) |
| *B01D 69/12* | (2006.01) |
| *B01D 71/26* | (2006.01) |
| *B01D 71/70* | (2006.01) |

(52) U.S. Cl.
CPC .......... *H01M 2/145* (2013.01); *H01M 10/0525* (2013.01); *B01D 2325/24* (2013.01); *B01D 71/26* (2013.01); *H01M 2/1653* (2013.01); *B01D 2323/20* (2013.01); *B01D 67/0079* (2013.01); *Y02E 60/122* (2013.01); *H01M 2/166* (2013.01); *B01D 67/003* (2013.01); *B01D 71/70* (2013.01); *B01D 69/148* (2013.01); *B01D 67/0027* (2013.01); *B01D 69/12* (2013.01); *B01D 67/002* (2013.01); *B01D 2325/22* (2013.01)
USPC ....................................... 429/144

(58) Field of Classification Search
None
See application file for complete search history.

(56) References Cited

U.S. PATENT DOCUMENTS

| | | | |
|---|---|---|---|
| 5,238,735 A | 8/1993 | Nagou et al. | |
| 6,245,270 B1 * | 6/2001 | Mizutani et al. | ............. 264/154 |

(Continued)

FOREIGN PATENT DOCUMENTS

| | | |
|---|---|---|
| JP | 10-110052 | 4/1998 |
| JP | 2010-176936 | 8/2010 |
| JP | 2011-006585 | 1/2011 |

OTHER PUBLICATIONS

EP patent application No. 10 25 2225, European Search Report mailed Jun. 21, 2011.

(Continued)

*Primary Examiner* — Patrick Ryan
*Assistant Examiner* — Wyatt McConnell
(74) *Attorney, Agent, or Firm* — Weaver Austin Villeneuve & Sampson LLP

(57) ABSTRACT

A method is presented for producing polyolefin microporous membranes which are superior in thermal stability and are particularly useful as a separator for a lithium ion battery. A process including a first step of melting polyolefin resin and mixing together at least melted polyolefin resin, organosiloxane particles including a polysiloxane cross-linked structure and having a spherical or golfball shape with an average particle diameter of 0.01-10 μm and a plasticizer to obtain a melted mixture, a second step of molding this mixture and biaxially stretching molded product to obtain a stretched film and a third step of extracting and removing the plasticizer from the stretched film is carried out, if a membrane having a single film layer is to be produced, to obtain this single film layer and, if a membrane having two or more laminated film layer is to be produced, to obtain the film layers on both outsides.

3 Claims, 1 Drawing Sheet

(56) References Cited

U.S. PATENT DOCUMENTS

2010/0009265 A1* 1/2010 Hatayama et al. ............ 429/254
2012/0135289 A1   5/2012 Noda

OTHER PUBLICATIONS

U.S. Appl. No. 12/955,095, Office Action mailed Mar. 4, 2013.

* cited by examiner

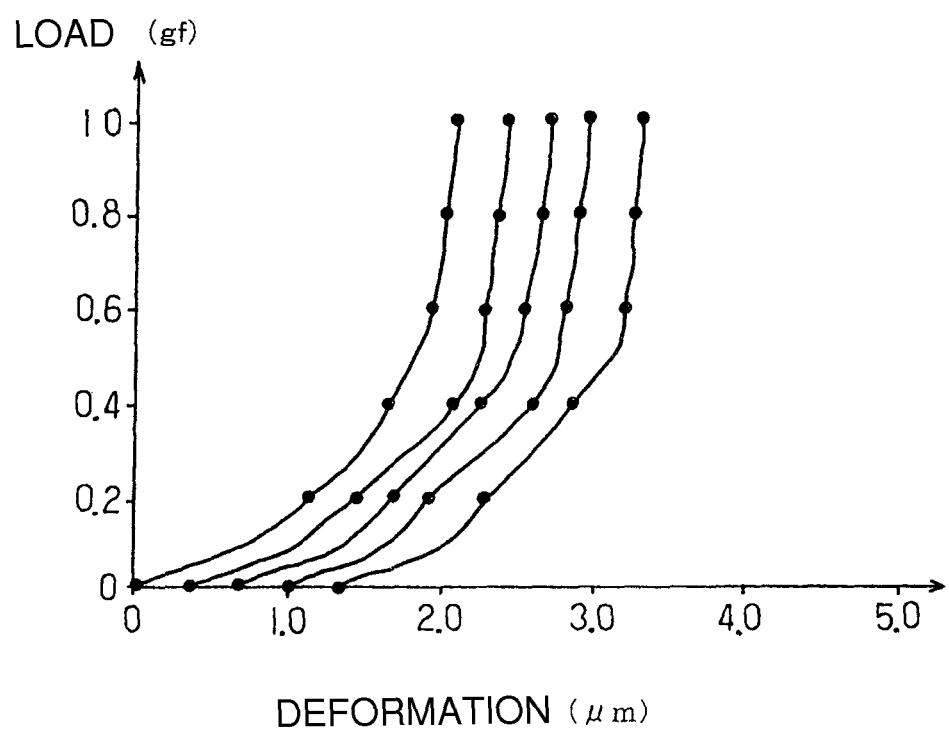

METHOD OF PRODUCING POLYOLEFIN MICROPOROUS MEMBRANE AND SEPARATOR FOR LITHIUM ION BATTERY

This is a continuation-in-part of application Ser. No. 12/955,095 filed Nov. 29, 2010, now pending.

The prior application is incorporated herein by reference in its entirety and for all purposes.

BACKGROUND OF THE INVENTION

This invention relates to a method of producing a polyolefin microporous membrane and a separator for a lithium ion battery.

Polyolefin microporous membranes are being used as a separator for a lithium ion battery, a precision filter membrane, a separator for a capacitor, and a material for a fuel cell. Use as a separator for a lithium ion cell used for a small-size electronic device such as portable telephones and notebook type personal computers as well as an automobile battery is attracting particular attention. This invention relates to a method of producing such polyolefin microporous membranes and separators for a lithium ion battery comprising polyolefin microporous membranes produced by this method.

As examples of method for producing such polyolefin microporous membranes as described above, Japanese Patent Publication Tokkai 10-50287 disclosed a molding method by using a mixture of polyolefin resin with inorganic powders such as titanium oxide, aluminum oxide and potassium titanate and Patent Publication WO2006-038532 disclosed a molding method by using a mixture of polyolefin resin with inorganic particles of oxides and nitrides of silicon, aluminum and titanium.

Since the inorganic powders and particles that are mixed with polyolefin resin in these prior art production methods for polyolefin microporous membranes hardly have any elasticity for enabling them to follow the drawing process carried out in the molding step for the microporous membrane and since their compatibility with polyolefin is not good, the molding process for the microporous membranes was very cumbersome and the microporous membranes obtained as a result developed various troubles such as pin holes and voids. In particular, the mechanical strength of the resultant microporous membranes is not sufficient and their thermal stability at high temperatures is inferior.

SUMMARY OF THE INVENTION

It is therefore an object of this invention to provide a production method for obtaining a polyolefin microporous membrane for which the molding operations are easy, being high in mechanical strength when made into a thin film, superior in stability at high temperatures, and hence suitable as a separator for a lithium ion battery, a precision filter membrane, a separator for a capacitor and a material for a fuel cell. Another object of this invention is to provide a separator for a lithium ion battery comprising a polyolefin microporous membrane produced by such a production method.

This invention is based on the discovery by the inventor hereof as a result of a diligent research in view of the objects described above that what responds to the objects of the invention is to use a specified process using organosilicone particles of a specified kind, in the case of a polyolefin microporous membrane with a single film layer, to produce this single film layer and, in the case of a polyolefin microporous membrane with two or more laminated film layers, to produce its both outer film layers.

BRIEF DESCRIPTION OF DRAWINGS

FIG. 1 is a graph that shows deformation-under-load curves obtained when five of organosilicone particles used in the production method of the present invention were selected and used on a micro-compression tester.

DETAILED DESCRIPTION OF THE INVENTION

This invention relates to a method of producing a polyolefin microporous membrane which may be of a single-layer structure or of a laminated structure having two or more layers, comprising a first step, a second step and a third step. If the polyolefin microporous membrane to be produces is of a kind having a single film layer, these first, second and third steps serve to obtain this single film layer. If the polyolefin microporous membrane to be produced is of a kind having two or more laminated film layers, those of the film layers that are on both outsides are obtained by these first, second and third steps.

In the above, the first step is for melting polyolefin resin and mixing together at least melted polyolefin resin, organosiloxane particles and a plasticizer to obtain a mixture, the second step is for molding the mixture and biaxially stretching molded product to obtain a stretched film, and the third step is for extracting and removing the plasticizer from the stretched film. The aforementioned organosilicone particles comprise a polysiloxane cross-linked structure and have a spherical or golfball shape with an average particle diameter of 0.01-10 μm, and the polysiloxane cross-linked structure comprises siloxane unit shown by formula $R^1SiO_{1.5}$ or siloxane unit shown by formula $R^1SiO_{1.5}$ and siloxane units selected from the group consisting of siloxane units shown by formulas $R^2R^3SiO$ and $SiO_2$ where $R^1$, $R^2$ and $R^3$ are each an organic group having a carbon atom directly connected to a silicon atom.

In summary, the polyolefin microporous membranes that may be produced by a method according to this invention may be either of a kind having a single-layer structure or of a laminated structure having two or more layers. According to this invention, therefore, for producing a miroporous membrane of the kind having a single film layer, this single layer is produced by a process consisting of the first, second and third steps, while, for producing a microporous membrane having two or more film layers in a laminated structure, those films on the outsides are produced by a process consisting of the first, second and third steps.

Organosilicone particles of a specified type are used according to the present invention. The average diameter of these organosilicone particles depends on the thickness of the molded microporous membrane but is normally 0.01-10 μm for improving the mechanical strength of the microporous membrane. It is preferable, however, to make it 5 μm or less for not adversely affecting the shutdown function of the obtained microporous membrane and also 0.05 μm or above for improving dispersing characteristics of the organosilicone particles with polyolefin and the plasticizer, that is, to adjust it to be in the range of 0.05-5 μm. It is preferable for the organosilicone particles to be uniformly shaped. Spherically shaped ones and those in the shape of a golfball are preferable, and spherical ones are particularly preferable.

Throughout herein, particles with a spherical surface having dimples, or small indentations, formed thereon will be referred to as being golfball-like or having a golfball shape, while particles with a relatively smooth spherical surface without such dimples will be referred to simply as being spherical.

As explained above, $R^1$ is an organic group having a carbon atom directly connected to a silicon atom. Examples of such organic group include both (1) those that are not a reactive group or do not have a reactive group and (2) those that are a reactive group or have a reactive group.

When $R^1$ is an organic group which either is not a reactive group or does not have a reactive group, examples of such an organic group include alkyl group, cycloalkyl group, aryl group, alkyl aryl group, and aralkyl group, but alkyl groups with 1-4 carbon atoms such as methyl group, ethyl group, propyl group and butyl group and phenyl group are preferable and methyl group is more preferable. When $R^1$ is such an organic group, preferable examples of siloxane unit $R^1SiO_{1.5}$ include methyl siloxane unit, ethyl siloxane unit, propyl siloxane unit, butyl siloxane unit and phenyl siloxane unit.

When $R^1$ is an organic group which either is a reactive group or has a reactive group, examples of such an organic group include epoxy group, (meth)acryloxy group, alkenyl group, mercaptoalkyl group, aminoalkyl group, haloalkyl group, glyceroxy group, ureide group, and cyano group, but alkyl groups having epoxy group such as 2-glycidoxyethyl group, 3-glycidoxypropyl group, and 2-(3,4-epoxy cyclohexyl)propyl group, (meth)acryloxy groups such as methacryloxy propyl group, and 3-acryloxypropyl group, alkenyl groups such as vinyl group, allyl group, and isopropenyl group, mercaptoalkyl groups such as mercaptopropyl group and mercaptoethyl group, and aminoalkyl groups such as 3-(2-aminoethyl)aminopropyl group, 3-aminopropyl group and N,N-dimethylaminopropyl group are preferable. When $R^1$ is such an organic group, preferable examples of siloxane unit $R^1SiO_{1.5}$ include (1) siloxane units having epoxy group such as 3-glycidoxy propyl siloxane unit, 2-(3,4-epoxycyclohexyl)ethylsiloxane unit, and 2-glycidoxyethyl siloxane unit, (2) siloxane units having (meth)acryloxy group such as 3-methacryloxy propyl siloxane unit and 3-acryloxypropyl siloxane unit, (3) siloxane units having alkenyl group such as vinyl siloxane unit, allyl siloxane unit, and isopropenyl siloxane unit, (4) siloxane units having mercaptoalkyl group such as mercaptopropyl siloxane unit, and mercaptoethyl siloxane unit, (5) siloxane units having aminoalkyl group such as 3-aminopropyl siloxane unit, 3-(2-aminoethyl)aminopropyl siloxane unit, N,N-dimethylaminopropyl siloxane unit, N,N-dimethylaminopropyl siloxane unit and N,N-dimethylaminoethyl siloxane unit, (6) siloxane units having haloalkyl group such as 3-chloropropyl siloxane unit and trifluoropropyl siloxane unit, (7) siloxane units having glyceroxy group such as 3-glyceroxypropyl siloxane and 2-glyceroxyethyl siloxane unit, (8) siloxane units having ureide group such as 3-ureidopropyl siloxane and 2-ureidoethyl siloxane unit, and (9) siloxane units having cyano group such as cyanopropyl siloxane unit and cyanoethyl siloxane unit, but siloxane units having epoxy group, siloxane units having (meth)acryloxy group, siloxane unit having alkenyl group, siloxane units having mercaptoalkyl group and siloxane units having aminoalkyl group are particularly preferable.

$R^2$ and $R^3$ in siloxane units $R^2R^3SiO$ are each an organic group having a carbon atom directly connected to a silicon atom. Examples of such organic group include both (1) those that are not a reactive group or do not have a reactive group and (2) those that are a reactive group or have a reactive group.

When $R^2$ and $R^3$ are each an organic group which either is not a reactive group or does not have a reactive group, examples of such an organic group are the same as those described above for $R^1$. When $R^2$ and $R^3$ are each such an organic group, examples of preferable siloxane unit $R^2R^3SiO$ include dimethyl siloxane unit, methylethyl siloxane unit, methylpropyl siloxane unit, methylbutyl siloxane unit, methylphenyl siloxane unit, diethyl siloxane unit, ethylpropyl siloxane unit, ethylbutyl siloxane unit, ethylphenyl siloxane unit, dipropyl siloxane unit, propylbutyl siloxane unit, dibutyl siloxane unit, butylphenyl siloxane unit, and diphenyl siloxane unit.

When $R^2$ and $R^3$ are each an organic group which either is a reactive group or has a reactive group, examples of such an organic group are the same as those described above for $R^1$.

As described above, organosilicone particles comprise a polysiloxane cross-link structure and those comprising either (1) siloxane unit shown by formula $R^1SiO_{1.5}$ or (2) siloxane unit shown by formula $R^1SiO_{1.5}$ and siloxane units which are selected from the group consisting of siloxane units shown by formulas $R^2R^3SiO$ and $SiO_2$, and in which the molar ratio of siloxane units $R^1SiO_{1.5}$ to the sum of siloxane units $R^2R^3SiO$ and $SiO_2$ is 100/0-50/50 are particularly preferable. If the molar ratio of the sum of siloxane units $R^2R^3SiO$ and $SiO_2$ exceeds 50 molar %, the mechanical strength of the obtained microporous membrane tends to be reduced.

In the first step of the method of this invention, polyolefin resin is melted and this melted polyolefin resin, organosilicone particles as explained above and a plasticizer are mixed together by using, for example, an extruder. This process is carried out at a temperature at which polyolefin resin comes to be in a melted condition, or usually at a temperature in the range of 160-300° C.

There is no particular limitation on the concentration ratio of the organosilicone particles when they are mixed, but it is preferably 5-60 mass %, more preferably 10-50 mass % and even more preferably 15-35 mass % with respect to the sum of the polyolefin resin and the organosilicone particles. If this concentration ratio is less than 5 mass % with respect to the aforementioned sum, the effect contributing to the thermal stability at high temperatures becomes reduced. If it exceeds 60 mass %, on the other hand, the mechanical strength tends to become reduced.

The plasticizer is preferably an organic compound capable, when mixed with polyolefin, of melting together above its melting point. Examples of such plasticizer include hydrocarbons such as fluidic paraffin and paraffin wax, esters of phthalic acid such as di-2-ethylhexyl phthalate, diheptyl phthalate and dibutyl phthalate, esters of sebacic acid, esters of stearic acid, esters of adipic acid and esters of phosphoric acid. These plasticizers may be used either singly or as a mixture of two or more kinds. The ratio of the plasticizer in the mixture, while being melted and mixed together, is preferably 20-80 mass %.

In the second step, a uniaxial extruder or a biaxial extruder is used to mold the aforementioned melted object being mixed together to further carry out biaxial stretching. Many molding means may be employed here but extrusion molding is preferable wherein the melted object being mixed together is extruded from a molding machine equipped with a sheet die such as a slot die or a T-die and then cooled. In the case where the polyolefin microporous membrane to be produced is of a kind having two or more laminated film layers, there is no limitation on the method of laminating these two or more film layers. Such a microporous membrane may be produced (1) by the method of extruding together from a single die or (2) by the method of molding films for forming by extrusion each of the film layers from each extruder, stacking them and integrating them by thermal adhesion but the method by co-extrusion is preferable because films with high interlayer adhesive strength and permeability can be obtained with superior productivity.

The biaxial stretching process after the molding process may be either simultaneous or sequential biaxial stretching but the drawing temperature is normally 100-135° C. and the drawing magnification is normally 3-200 times in area magnification.

In the third step, the plasticizer is extracted from the biaxially stretched film and discarded. Extraction of the plasticizer is carried out by soaking the biaxially stretched film in an extraction solvent and the film is thereafter sufficiently dried. The extraction solvent is preferably one which is a poor solvent for polyolefin and organosilicone particles and a good solvent for the plasticizer, having a boiling point lower than that of polyolefin. Examples of such extraction solvent include chlorine-type solvents such as methylene chloride and 1,1,1-trichloroethane, ketones such as methylethyl ketone and acetone, organic halogen solvents such as hydrofluorocarbon, hydrofluoroether, ring-forming hydrofluorocarbon, perfluorocarbon and perfluoroether, ethers such as diethylether and tetrahydrofuran, hydrocarbons such as n-hexane and cyclohexane, and alcohols such as methanol and isopropyl alcohol, but methylene chloride is particularly preferable. These extraction solvents may be used singly or in combination of two or more kinds.

After the plasticizer has been extracted, the drawing process may be carried out further, if necessary, for adjusting physical characteristics such as thickness and air resistance. This drawing may be carried out as uniaxial stretching, simultaneous biaxial stretching or sequential biaxial stretching but biaxial stretching and sequential biaxial stretching are preferable. The drawing temperature is usually 100-135° C. and the drawing magnification is usually 10 times or less in area magnification.

In the case where the polyolefin microporous membrane to be produced is of a kind having two or more laminated film layers, it is preferable that the pores in each film layer are three-dimensionally combined to form a three-dimensional network structure and that these three-dimensional structures of the individual layers are mutually connected. Three-dimensional structures are structures having surfaces in a vein state and sponge-like sectional membrane structure as seen from the direction of any arbitrary three-dimensional coordinate axis. In the above, the vein state means a state having fibrils in a network structure. This may be ascertained by observing the surface and taking a sectional view by means of a scanning electron microscope. The fibril diameter of the three-dimensional network structure is preferably 0.01-0.1 µm.

Polyolefin microporous membranes produced by a method according to this invention are superior in mechanical strength and thermal stability at high temperatures and particularly suitable as a separator for a lithium ion battery.

Thus, if a method according to the present invention is used, polyolefin microporous membranes can be obtained that bring about no trouble under good molding operational conditions and are superior particularly in mechanical strength and thermal stability at high temperatures and hence are useful as a separator for a lithium ion battery.

EXAMPLES

The invention is explained next by way of examples but these examples are not intended to limit the scope of the invention.

Part 1 (Synthesis of Organosilicone Particles)
Synthesis of Organosilicone Particles (P-1)

Ion exchange water 700 g was placed in a reactor, 48% aqueous solution of sodium hydroxide 0.6 g and 20% aqueous solution of α-(p-nonylphenyl)-ω-hydroxy(polyoxyethylene) (the number of oxyethylene units=10) 0.25 g were added and a uniform solution was obtained by stirring well. While the temperature of this solution was maintained at 14° C., mixed monomer of methyltrimethoxy silane 122.6 g (0.9 mols) and dimethyldimethoxy silane 12.0 g (0.1 mol) was gradually dropped in such that the aqueous solution and the monomer layers would not become mixed. After the dropping was finished, it was stirred slowly in a laminar flow condition with both layers maintained. After one hour, 10% aqueous solution of sodium dodecylbenzene sulfonate 3 g was added and the mixture was similarly stirred slowly for 3 hours at 14° C. A condensation reaction was continued for 5 hours at 30-80° C. to obtain an aqueous suspension containing organosilicone particles. After this aqueous suspension was passed through a membrane filter with pore diameter 2 µm produced by Advantec MFS, Inc., white particles were separated from the filtered liquid portion by using a centrifugal separator. The separated white particles were washed with water and dried in a heated air stream of 150° C. for 5 hours to obtain organosilicone particles (P-1) 60.1 g. Observation by a scanning electron microscope, elemental analysis, inductively coupled plasma spectrometry and FT-IP spectrometry was carried out on organosilicone particles (P-1). As a result, it was determined that organosilicone particles (P-1) were spherical particles with average diameter of 0.3 µm, comprising polysiloxane cross-link structure having to siloxane units shown by $R^1SiO_{1.5}$ and $R^2R^3SiO$ at molar ratio of 90/10.

Synthesis of Organosilicone Particles (P-2)

Ion exchange water 700 g was placed in a reactor, 48% aqueous solution of sodium hydroxide 0.6 g and 20% aqueous solution of α-(p-nonylphenyl)-ω-hydroxy(polyoxyethylene) (the number of oxyethylene units=10) 0.61 g were added and a uniform solution was obtained by stirring well. While the temperature of this solution was maintained at 14° C., mixed monomer of methyltrimethoxy silane 122.6 g (0.9 mols) and tetraethoxysilane 20.8 g (0.1 mol) was gradually dropped in such that the aqueous solution and the monomer layers would not become mixed. After the dropping was finished, it was stirred slowly in a laminar flow condition with both layers maintained. After one hour, 10% aqueous solution of sodium dodecylbenzene sulfonate 3 g was added and the mixture was similarly stirred slowly for 3 hours at 14° C. A condensation reaction was continued for 5 hours at 30-80° C. to obtain an aqueous suspension containing organosilicone particles. After this aqueous suspension was passed through a membrane filter with pore diameter 2 µm produced by Advantec MFS, Inc., white particles were separated from the filtered liquid portion by using a centrifugal separator. The separated white particles were washed with water and dried in a heated air stream of 150° C. for 5 hours to obtain organosilicone particles (P-2) 60.1 g. Observation by a scanning electron microscope, elemental analysis, inductively coupled plasma spectrometry and FT-IP spectrometry was carried out on organosilicone particles (P-2). As a result, it was determined that organosilicone particles (P-2) were golfball-like particles with average diameter of 1 µm, comprising polysiloxane cross-link structure having siloxane units shown by $R^1SiO_{1.5}$ and $SiO_2$ at molar ratio of 90/10.

Synthesis of Organosilicone Particles (P-3)

Ion exchange water 700 g was placed in a reactor, and 48% aqueous solution of sodium hydroxide 0.6 g and 20% aqueous solution of α-(p-nonylphenyl)-ω-hydroxy(polyoxyethylene) (the number of oxyethylene units=10) 0.21 g were added and a uniform solution was obtained by stirring well. While the temperature of this solution was maintained at 14° C., silicon monomer of methyltrimethoxysilane 136.2 g (1 mol) was gradually dropped in such that the aqueous solution and the monomer layers would not become mixed. After the dropping was finished, it was stirred slowly in a laminar flow condition with both layers maintained. After one hour, 10% aqueous solution of dodecylbenzene sulfonic acid sodium 3 g was added and the mixture was similarly stirred slowly for 3 hours at 14° C. A condensation reaction was continued for 5 hours at 30-80° C. to obtain an aqueous suspension containing organosilicone particles. After this aqueous suspension was passed through a membrane filter with pore diameter 2 μm produced by Advantec MFS, Inc., white particles were separated from the filtered liquid portion by using a centrifugal separator. The separated white particles were washed with water and dried in a heated air stream of 150° C. for 5 hours to obtain organosilicone particles (P-3) 60.1 g. Observation by a scanning electron microscope, elemental analysis, inductively coupled plasma spectrometry and FT-IP spectrometry was carried out on organosilicone particles (P-3). As a result, it was determined that organosilicone particles (P-3) were spherical particles with average diameter of 100 nm, comprising polysiloxane cross-link structure having siloxane units shown by $R^1SiO_{1.5}$.

Synthesis of Organosilicone Particles (P-4)

Ion exchange water 700 g was placed in a reactor, and 48% aqueous solution of sodium hydroxide 0.3 g was added to prepare an aqueous solution. Methyltrimethoxysilane (0.8 mols) and dimethyldimethoxy silane (0.2 mols) were added to this aqueous solution and hydrolysis reaction was continued for one hour while temperature was maintained at 13-15° C. Next, 10% aqueous solution of sodium dodecylbenzene sulfonate 3 g was added and hydrolysis reaction was continued for 3 hours at the same temperature to obtain a transparent reaction product containing silanol compound. Next, the temperature of the obtained reaction product was maintained at 30-80° C. and a condensation reaction was carried out for 5 hours to obtain an aqueous suspension containing organosilicone particles. After this aqueous suspension was passed through a membrane filter with pore diameter 5 μm produced by Advantec MFS, Inc., white particles were separated from the filtered liquid portion by using a centrifugal separator. The separated white particles were washed with water and dried in a heated air stream of 150° C. for 5 hours to obtain organosilicone particles (P-4) 60.1 g. Observation by a scanning electron microscope, elemental analysis, inductively coupled plasma spectrometry and FT-IP spectrometry was carried out on organosilicone particles (P-4). As a result, it was determined that organosilicone particles (P-4) were spherical particles with average diameter of 2.0 μm, comprising polysiloxane cross-link structure having siloxane units shown by $R^1SiO_{1.5}$ and $R^2R^3SiO$ at molar ratio of 80/20.

FIG. 1 is a graph that shows deformation-under-load curves obtained when five of synthesized organosilicone particles (P-4) were arbitrarily selected and used on a minute compression tester. The vertical axis represents load (gf) and the horizontal axis represents deformation (μm). FIG. 1 shows that organosilicone particles (P-4) are hardly destructable under load variations.

Synthesis of Organosilicone Particles (P-5)

Ion exchange water 700 g was placed in a reactor, and 48% aqueous solution of sodium hydroxide 0.3 g was added to prepare an aqueous solution. Methyltrimethoxysilane 81.7 g (0.6 mols) and dimethyldimethoxy silane 48.1 g (0.4 mols) were added to this aqueous solution and reactions were carried out as for the synthesis of organosilicone particles (P-4). Organosilicone particles (P-5) thus synthesized were spherical particles with average diameter of 2.0 μm, comprising polysiloxane cross-link structure having siloxane units shown by $R^1SiO_{1.5}$ and $R^2R^3SiO$ at molar ratio of 60/40.

Synthesis of Organosilicone Particles (P-6)

Ion exchange water 700 g was placed in a reactor, 48% aqueous solution of sodium hydroxide 0.6 g and 20% aqueous solution of α-(p-nonylphenyl)-ω-hydroxy(polyoxyethylene) (the number of oxyethylene units=10) 0.61 g were added and a uniform solution was obtained by stirring well. While the temperature of this solution was maintained at 14° C., mixed monomer of methyltrimethoxysilane 109.0 g (0.8 mols), dimethyldimethoxy silane 12.0 g (0.1 mol) and tetraethoxysilane 20.8 (0.1 mol) was added to carry out reactions as for the synthesis of organosilicone particles (P-2). Organosilicone particles (P-6) thus synthesized were golfball-like particles with average diameter of 1 μm, comprising polysiloxane cross-link structure having siloxane units shown by $R^1SiO_{1.5}$, $R^2R^3SiO$ and $SiO_2$ at molar ratio of 80/10/10.

Details of these synthesized organosilicone particles are shown together in Table 1.

TABLE 1

| | | Silicon monomer (molar %) | | | Average particle | Particle composition (molar ratio) | | |
|---|---|---|---|---|---|---|---|---|
| | Shape | MTS | DMS | TEOS | diameter (μm) | $R^1SiO_{1.5}$ | $R^2R^3SiO$ | $SiO_2$ |
| P-1 | Spherical | 90 | 10 | | 0.3 | 0.9 | 0.1 | |
| P-2 | Golfball-like | 90 | | 10 | 1.0 | 0.9 | | 0.1 |
| P-3 | Spherical | 100 | | | 0.1 | 1.0 | | |
| P-4 | Spherical | 80 | 20 | | 2.0 | 0.8 | 0.2 | |
| P-5 | Spherical | 60 | 40 | | 2.0 | 0.6 | 0.4 | |
| P-6 | Golfball-like | 80 | 10 | 10 | 1.0 | 0.8 | 0.1 | 0.1 |

In Table 1:
MTS: Methyltrimethoxysilane
DMS: Dimethylmethoxy silane
TEOS: Tetraethoxysilane Part 2 (Production of Polyolefin Microporous Membranes)

Test Example 1

Polyethylene composition was obtained by adding 0.2 mass parts of antioxidant to ultrahigh molecular weight polyethylene composition with mass average molecular weight of $2.5 \times 10^6$ (6 mass parts) and high molecular weight polyethylene composition with mass average molecular weight of $3.5 \times 10^5$ (30 mass parts). This polyethylene composition (30.2 mass parts), organosilicone particles (P-1) synthesized in Part 1 (8 mass parts) and bis(p-ethylbenzylidene) sorbitol (2 mass parts) as nucleating agent were placed in a biaxial extruder (58 mmΦ, L/D=42, strong mixing type). Fluidic paraffin (70 mass parts) was also supplied from the side feeder of this biaxial extruder, and the mixture was melted and mixed together at 200° C. at 200 rpm, extruded from the T-die attached to the front end of the biaxial extruder and immediately cooled and solidified by a cast roll cooled to 25° C. to mold a sheet with thickness of 1.5 mm. After this sheet was drawn to 5×5 times at 124° C. by using a simultaneous biaxial stretching machine, it was soaked in methylene chloride to extract and remove the fluidic paraffin and then dried and a tenter drawing machine was used to draw it 1.5 times in a transverse direction at 125° C. This drawn sheet was thereafter eased at 130° C. in the transverse direction for a heat treatment, and a microporous membrane of Test Example 1 comprising a single film layer was produced.

Test Example 2

Microporous membrane of Test Example 2 was produced in the same way as in Test Example 1 except that organosilicone particles (P-2) synthesized in Part 1 were used as organosilicone particles.

Test Example 3

Microporous membrane of Test Example 3 was produced in the same way as in Test Example 1 except that organosilicone particles (P-3) synthesized in Part 1 were used as organosilicone particles.

Test Example 4

Microporous membrane of Test Example 4 was produced in the same way as in Test Example 1 except that organosilicone particles (P-4) synthesized in Part 1 were used as organosilicone particles.

Test Example 5

Microporous membrane of Test Example 5 was produced in the same way as in Test Example 1 except that organosilicone particles (P-5) synthesized in Part 1 were used in an amount of 21.5 mass parts as organosilicone particles.

Test Example 6

Microporous membrane of Test Example 6 was produced in the same way as in Test Example 1 except that organosilicone particles (P-6) synthesized in Part 1 were used in an amount of 3.6 mass parts as organosilicone particles.

Comparison Example 1

Microporous membrane of Comparison Example 1 was produced in the same way as in Test Example 1 except that organosilicone particles 1 were not used.

Comparison Example 2

Microporous membrane of Comparison Example 2 was produced in the same way as in Test Example 1 except that spherical silica particles (Seahostar KE-P10 (tradename) produced by Nippon Shokubai Co., Ltd., average diameter=100 nm) were used instead of organosilicone particles.

Comparison Example 3

Microporous membrane of Comparison Example 3 was produced in the same way as in Test Example 1 except that spherical polymethyl methacrylate particles (Epostar MA-1002 (tradename) produced by Nippon Shokubai Co., Ltd., average diameter=2.5 μm) were used instead of organosilicone particles.

Comparison Example 4

Microporous membrane of Comparison Example 4 was produced in the same way as in Test Example 1 except that spherical silica particles (Seahostar KE-P10 (tradename) produced by Nippon Shokubai Co., Ltd., average diameter=100 nm) were used in an amount of 20.1 mass units instead of organosilicone particles.

Part 3 (Measurement of Physical Characteristics of Polyolefin Microporous Membranes)

Film thickness (μm), average throughhole diameter (nm), air resistance (sec/100 cc), tension breaking strength (MPa) and thermal shrinkage rate (%) of each of the microporous membranes produced in Part 2 were measured as follows, and the results are shown together in Table 2.

Film thickness (μm): A scanning electron microscope (SEM) was used for measuring cross-sectional surface of each microporous membrane.

Average throughhole diameter (nm): Belsorp-mini ((tradename) produced by Japan Bell Co., Ltd.) was used.

Air resistance (sec/100 cc): A Gurley type porosity analyzer (G-B2 (tradename) produced by Toyo Seiki Manufacturing Co.) was used for measurement according to JIS-P8117.

Tension breaking strength (MPa): An elongated test piece of width 15 mm was cut from each microporous membrane and its tension breaking strength was measured according to ASTM D882.

Thermal shrinkage rate (%): A square test piece of size 120 mm×120 mm was cut from each microporous membrane and was marked at three places at intervals of 100 mm by an oil pen. It was sandwiched between sheets of A4 size copy paper (produced by Kokuyo) and the copy paper sheets were stapled together on a side edge by using a stapler. It was laid horizontally inside an oven at 150° C. and left there for one hour. It was then cooled with air and the distances (mm) between the marks were measured. The thermal shrinkage rate was calculated as follows from the average from the three places: Thermal shrinkage rate (%)=((100−Distance (mm) between marks after heating)/100 (mm))×100.

TABLE 2

| | Organosilicone particles, etc. | | Film thickness (μm) | Average through-hole diameter (nm) | Air resistance (sec/100 cc) | Tension breaking strength (MPa) | Thermal shrinkage rate (%) |
|---|---|---|---|---|---|---|---|
| | Type | Ratio (mass %) | | | | | |
| TE-1 | P-1 | 20 | 25 | 30 | 590 | 102 | 8 |
| TE-2 | P-2 | 20 | 25 | 30 | 590 | 105 | 6 |
| TE-3 | P-3 | 20 | 25 | 30 | 610 | 100 | 7 |

TABLE 2-continued

|  | Organosilicone particles, etc. | | Film thickness (μm) | Average through-hole diameter (nm) | Air resistance (sec/100 cc) | Tension breaking strength (MPa) | Thermal shrinkage rate (%) |
|---|---|---|---|---|---|---|---|
|  | Type | Ratio (mass %) | | | | | |
| TE-4 | P-4 | 20 | 30 | 45 | 690 | 98 | 10 |
| TE-5 | P-5 | 40 | 30 | 55 | 710 | 90 | 4 |
| TE-6 | P-6 | 10 | 25 | 30 | 550 | 95 | 15 |
| CE-1 | — | 0 | 25 | 30 | 610 | 13 | 70 |
| CE-2 | R-1 | 20 | 25 | 30 | 440 | 58 | 36 |
| CE-3 | R-2 | 20 | 30 | 50 | 700 | 36 | 70 |
| CE-4 | R-1 | 40 | — | — | — | — | — |

In Table 2:
TE: Test Example
CE: Comparison Example
P-1-P-6: Organosilicone particles shown in Table 1
R-1: Spherical silica particles (Seahostar KE-P10 (tradename) produced by Nippon Shokubai Co., Ltd., average diameter = 100 nm)
R-2: Spherical polymethyl methacrylate particles (Epostar MA-1002 (tradename) produced by Nippon Shokubai Co., Ltd., average diameter = 2.5 μm)

Table 2 clearly shows that microporous membranes produced by a method according to this invention have average throughhole diameters and air resistance values as originally desired and are superior in mechanical strength because their tension breaking strengths are particularly high and also that they are superior in thermal stability at high temperatures because they are low in shrinkage.

Part 4 (Production of Polyolefin Microporous Membranes)

Test Example 7

As material for the film for forming the both outside surface film layers, polypropylene (density=0.90, viscosity average molecular weight=300,000) (32 mass parts), organosilicone particles (P-1) synthesized in Part 1 (9 mass parts), bis(p-ethylbenzylidene)sorbitol (2 mass parts) as nucleating agent, tetrakis-(methylene-(3'-5'-di-t-butyl-4'-hydroxyphenyl)propionate)methane (0.3 mass parts) as antioxidant, and fluidic paraffin (12 mass parts) as plasticizer were mixed together in a mixer. As material for forming the intermediate film layer, high density polyethylene (density=0.95, viscosity average molecular weight=250,000) (40 mass parts) and tetrakis-(methylene-(3'-5'-di-t-butyl-4'-hydroxyphenyl)propionate)methane (0.3 mass parts) as antioxidant were similarly mixed together. Both materials were placed in two biaxial extruder feeders with diameter 25 mm and L/D=48, and a sheet with thickness of 1.5 mm was molded by supplying fluidic paraffin (48 mass parts) to the biaxial extruder for forming the both outside surface film layers and fluidic paraffin (60 mass parts) to the biaxial extruder for the material for forming the intermediate film layer through the respective side feeders, and extruding from the T-dies attached to the front parts of the extruders and being capable of co-extrusion (two kinds in three layers), while mixing under the condition of 200° C. and 200 rpm, such that the rate of extrusion from the part for forming the both outside surface film layers would be 5 kg/hour and the rate of extrusion from the part for forming the intermediate film layer would be 15 kg/hour, and using a cast roll cooled to 25° C. for immediately cooling and solidifying. After this sheet was drawn to 7×7 times by using a biaxial stretching machine under the condition of 124° C., it was soaked in methylene chloride and fluidic paraffin was extracted and removed and it was thereafter dried and drawn to 1.5 times in a transverse direction by using a tenter drawing machine under the condition of 125° C. This drawn sheet was thereafter eased 7% in the transverse direction to carry out a heat treatment at 130° C. to produce a microporous membrane comprising laminated films of a two-kind and three-layer structure with films for forming both outside surface film layers being of the same composition and the film for forming the intermediate film layer having a different composition.

Test Example 8

Microporous membrane of Test Example 8 was produced as in Test Example 7 except that organosilicone particles (P-2) synthesized in Part 1 were used.

Test Example 9

Microporous membrane of Test Example 9 was produced as in Test Example 7 except that organosilicone particles (P-3) synthesized in Part 1 were used.

Test Example 10

Microporous membrane of Test Example 10 was produced as in Test Example 7 except that organosilicone particles (P-4) synthesized in Part 1 were used.

Test Example 11

Microporous membrane of Test Example 11 was produced as in Test Example 7 except that organosilicone particles (P-5) synthesized in Part 1 (5.6 mass parts) were used.

Test Example 12

Microporous membrane of Test Example 12 was produced as in Test Example 7 except that organosilicone particles (P-6) synthesized in Part 1 (23.2 mass parts) were used.

Comparison Example 5

Microporous membrane of Comparison Example 5 was produced as in Test Example 7 except that organosilicone particles were not used.

Comparison Example 6

Microporous membrane of Comparison Example 6 was produced as in Test Example 7 except that spherical silica particles (Seahostar KE-P10 (tradename) produced by Nippon Shokubai Co., Ltd., average diameter=100 nm) were used instead of organosilicone particles.

Comparison Example 7

Microporous membrane of Comparison Example 7 was produced as in Test Example 7 except that spherical polymethyl methacrylate particles (Epostar MA-1002 (tradename) produced by Nippon Shokubai Co., Ltd., average diameter=2.5 µm) were used instead of organosilicone particles.

Comparison Example 8

Microporous membrane of Comparison Example 68 was produced as in Test Example 7 except that spherical polymethyl methacrylate particles (Epostar MA-1002 (tradename) produced by Nippon Shokubai Co., Ltd., average diameter=2.5 µm) were used in an amount of 17.2 mass parts instead of organosilicone particles.

Part 5 Measurement of Physical Characteristics of Polyolefin Microporous Membranes Film thickness (µm), average throughhole diameter (nm), air resistance (sec/100 cc), tension breaking strength (MPa) and thermal shrinkage rate (%) of each of the microporous membranes produced in Part 4 were measured as explained in Part 3. The results are shown together in Table 3.

Table 3 clearly shows that microporous membranes produced by a method according to this invention have average through-hole diameters and air resistance values as originally desired and are superior in mechanical strength because their tension breaking strengths are particularly high and also that they are superior in thermal stability at high temperatures because they have low thermal shrinkages.

What is claimed is:

1. A method of producing a polyolefin microporous membrane, said method comprising a first step, a second step and a third step;
    said first, second and third steps, if said polyolefin microporous membrane is of a kind having a single film layer, serving to obtain said single film layer and, if said polyolefin microporous membrane is of a kind having two or more laminated film layers, serving to obtain those of said film layers that are on both outsides;
    said first step being for melting polyolefin resin and mixing together at least melted polyolefin resin, organosiloxane particles and a plasticizer to obtain a mixture;
    said second step being for molding said mixture and biaxially stretching molded product to obtain a stretched film;
    said third step being for extracting and removing said plasticizer from said stretched film;
    said organosiloxane particles comprising a polysiloxane cross-linked structure and having a spherical or golfball shape with an average particle diameter of 0.01-10 µm; and said polysiloxane cross-linked structure comprising siloxane unit shown by formula $R^1SiO_{1.5}$, siloxane unit shown by formula $R^2R^3SiO$ and siloxane unit shown by formula $SiO_2$ where $R^1$, $R^2$ and $R^3$ are each an organic group having a carbon atom directly connected to a silicon atom, said polysiloxane cross-linked structure containing said siloxane unit shown by formula $R^1SiO_{1.5}$ and the sum of said siloxane unit shown by formula $R^2R^3SiO$ and siloxane unit shown by formula $SiO_2$ at a molar ratio of 50/50 or more.

2. The method of claim 1 wherein the organosiloxane particles are mixed together at a rate of 5-60 mass % with respect to the sum of the polyolefin resin and the organosiloxane particles.

TABLE 3

| | Organosilicone particles in both outside surface film layers, etc. | | Film thickness (µm) | Average through-hole diameter (nm) | Air resistance (sec/100 cc) | Tension breaking strength (MPa) | Thermal shrinkage rate (%) |
|---|---|---|---|---|---|---|---|
| | Type | Ratio (mass %) | | | | | |
| TE-7 | P-1 | 21 | 2 | 30 | 410 | 140 | 5 |
| TE-8 | P-2 | 21 | 2 | 30 | 440 | 145 | 5 |
| TE-9 | P-3 | 21 | 2 | 30 | 390 | 160 | 4 |
| TE-10 | P-4 | 21 | 3 | 45 | 490 | 120 | 9 |
| TE-11 | P-5 | 15 | 2 | 30 | 420 | 125 | 10 |
| TE-12 | P-6 | 42 | 3 | 50 | 500 | 155 | 4 |
| CE-5 | — | 0 | 2 | 30 | 440 | 60 | 31 |
| CE-6 | R-1 | 21 | 2 | 30 | 420 | 80 | 16 |
| CE-7 | R-2 | 21 | 3 | 50 | 510 | 75 | 22 |
| CE-8 | R-2 | 35 | 3 | 50 | 520 | 70 | 25 |

3. A separator for a lithium ion battery comprising a polyolefin microporous membrane produced by the method of claim 2.

* * * * *